United States Patent [19]
Hackler

[11] 3,864,355
[45] Feb. 4, 1975

[54] ANTIVIRAL 3-ARYL-5-(CYANOBENZYLIDENE)OXAZOLIDINE 2,4-DIONES

[75] Inventor: Ronald E. Hackler, Indianapolis, Ind.

[73] Assignee: Eli Lilly and Company, Indianapolis, Ind.

[22] Filed: Apr. 23, 1973

[21] Appl. No.: 353,926

[52] U.S. Cl. .............................. 260/307 B, 424/272
[51] Int. Cl............................................. C07d 85/34
[58] Field of Search .................................. 260/307 B

[56] References Cited
UNITED STATES PATENTS
3,709,895  1/1973  Kohlhaupt et al............... 260/307 B Primary Examiner—Raymond V. Rush
Attorney, Agent, or Firm—William E. Maycock

[57] ABSTRACT

3-Aryl-5-(α-cyanobenzylidene)oxazolidine-2,4-diones useful as antiviral agents against PR8, group A2 influenza virus in mice. The compounds can be prepared by condensing a substituted ethyl cyanopyruvate with an isocyanate.

6 Claims, No Drawings

ANTIVIRAL 3-ARYL-5-(CYANOBENZYLIDENE)OXAZOLIDENE 2,4-DIONES

BACKGROUND OF THE INVENTION

This invention relates to oxazolidine-2,4-diones. More particularly, this invention relates to 3-aryl-5-($\alpha$-cyanobenzylidene)oxazolidine-2,4-diones useful as antiviral agents against PR8, group A2, influenza virus in mice.

Because viruses are obligate intracellular parasites that require the active participation of the metabolic processes of the invaded cell, the development of compounds useful as antiviral agents has presented problems more difficult than those encountered in the search for drugs effective against other microorganisms. For example, agents which are effective against viruses frequently injure the invaded cells.

Consequently, the search for antiviral agents has been both long and intensive. However, very few compounds have been found to have clinical applicability. Even these are not free of problems. For example, amantadine is effective against different strains of Asian (A2) influenza, but the compound exhibits substantial neurotoxicity. As a further example, methisazone is useful against the pox group of viruses, but may induce vomiting in the patient. Thus, the search for new antiviral agents continues.

SUMMARY OF THE INVENTION

It therefore is an object of the present invention to provide 3-aryl-5-($\alpha$-cyanobenzylidene)oxazolidine-2,4-diones which are useful as antiviral agents.

It now has been discovered that 3-aryl-5-($\alpha$-cyanobenzylidene)oxazolidine-2,4-diones having the following general formula are effective as antiviral agents against PR8, group A2, influenza virus in mice:

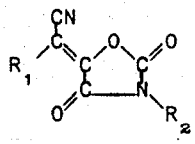

wherein $R_1$ is a monovalent aryl group selected from the group consisting of phenyl and p-chlorophenyl and $R_2$ is a monovalent aryl group selected from the group consisting of phenyl, p-chlorophenyl, and 1-naphthyl, with the limitation that when $R_2$ is 1-naphthyl, $R_1$ is phenyl.

DETAILED DESCRIPTION OF THE INVENTION

The compounds of the present invention can be prepared by reacting either ethyl phenylcyanopyruvate or ethyl p-chlorophenylcyanopyruvate with phenyl isocyanate, p-chlorophenyl isocyanate, or 1-naphthyl isocyanate, except that when 1-naphthyl isocyanate is used, the cyanopyruvate must be ethyl phenylcyanopyruvate.

The substituted ethyl cyanopyruvates useful in the preparation of the compounds of the present invention are readily prepared by any of the various means known to those skilled in the art. A particularly useful procedure is found in A. H. Blatt, Editor, "Organic Syntheses," Collective Volume II, John Wiley and Sons, Inc., New York, 1943, p. 287, wherein ethyl oxalate and benzyl cyanide are condensed in the presence of sodium ethoxide in ethanol to give ethyl phenylcyanopyruvate.

In general, the reaction is carried out in a solvent or solvent mixture having no active hydrogen atoms. Examples of suitable solvents include, among others, aromatic hydrocarbons, such as benzene, toluene, the xylenes, and the like; halogenated hydrocarbons, such as chloroform, ethylene dichloride, perchloroethylene, chlorobenzene, and the like; ketones, such as acetone, methyl ethyl ketone, methyl isobutyl ketone, and the like; ethers, such as ethyl ether, methyl isopropyl ether, n-butyl ether, $\alpha$-methoxytoluene, 2-methoxytoluene, 3-methoxytoluene, 4-methoxytoluene, ethoxybenzene, 1,3-dioxane, 1,4-dioxane, tetrahydrofuran, and the like; and miscellaneous solvents, such as N,N-dimethylformamide, N,N-dimethylacetamide, dimethyl sulfoxide, N-methyl-2-pyrrolidone, and the like. The preferred solvents are ethers, with ethyl ether and tetrahydrofuran being most preferred.

The amount of solvent employed is not critical, but generally is dependent upon the solubility characteristics of the reactants. Usually the reactants will constitute less than about 50 percent by weight of the reaction mixture; preferably, the reactants will constitute less than about 20 percent by weight of the reaction mixture.

The reaction preferably is carried out in the presence of a catalyst which is a tertiary amine; the preferred catalyst is triethylenediamine. The amount of catalyst employed can vary from about 0.001 mole to about 0.01 mole per mole of substituted ethyl cyanopyruvate; preferably, the amount of catalyst employed will be about 0.005 mole per mole of substituted ethyl cyanopyruvate.

In general, the reaction can be carried out at temperatures in the range from about 20°C. to the reflux temperature of the solvent or solvents employed. Obviously, the upper temperature limit must be below the decomposition temperature of the least-stable reactant. Preferably, the reaction temperature will be below about 100°C.

The molar ratio of substituted ethyl cyanopyruvate to isocyanate normally will be 1:1, which ratio is preferred. However, this ratio can vary from about 2:1 or higher to about 1:2 or lower.

While the reaction normally will be carried out at atmospheric pressure, sub- or superatmospheric pressures can be employed if desired or necessary, e.g., to lower or raise the boiling point of the solvent employed or to shift the reaction equilibrium.

The compounds of the present invention are useful as antiviral agents, e.g. against PR8, group A2, influenza virus in mice. The compounds may be administered, in accordance with the instant invention, by any convenient parenteral route, i.e., subcutaneously, intravenously, intramuscularly, or intraperitoneally.

The dosage administered will be dependent upon the age, health, and weight of the recipient; king of concurrent treatment, if any, frequency of treatment, and nature of the effect desired. Generally, a daily dosage of a compound of the present invention will be from about 50 to about 200 milligrams per kilogram of body weight, although lower or higher amounts can be used. Usually, from about 50 to about 150, preferably from about 50 to about 100, milligrams per kilogram per day in one or more applications per day is effective to obtain the desired result.

A compound of the present invention can be employed in a useful composition according to the present invention by incorporating such a compound in a liquid solution or suspension, except that suspensions are not employed for intravenous administrations. In such a composition, the compounds of the present invention ordinarily will be present in an amount of at least 0.0001 and not more than 99 percent by weight based on the total weight of the composition.

In addition to a compound of the present invention, the composition will contain a liquid non-toxic pharmaceutical carrier for said compound. The pharmaceutical carrier can be a sterile liquid, such as water and oils, including petroleum, animal, vegetable, and synthetic oils, examples of such oils being peanut oil, soybean oil, mineral oil, cod liver oil, and the like. In general, water, saline, and aqueous dextrose (glucose) and related sugar solutions are the preferred liquid carriers. Such sterile injectible solutions ordinarily will contain from about 0.5 to about 25, and preferably from about 5 to 25, percent by weight of a compound of the present invention.

Suitable pharmaceutical carriers are described in E. W. Martin, et al., "Remington's Pharmaceutical Sciences," 14th Ed., Mack Publishing Company, Easton, Pa., 1965.

Of course, mixtures of two or more of the compounds of the present invention are contemplated. Also, mixtures of the compounds of the present invention with one or more other pharmaceutically-active materials is considered to be within the scope of the present invention.

The present invention will be more fully described, without intending to limit it in any manner, by the following examples which illustrate certain preferred embodiments. Unless otherwise indicated, all percentages and parts are by weight, and all temperatures are in degrees centigrade.

EXAMPLE 1

A solution of 21.7 parts of ethyl phenylcyanopyruvate, 11.9 parts of phenyl isocyanate, and about 0.05 part of triethylenediamine in 430 parts of ether was allowed to stand at ambient temperature (about 23°) for 3 days. Most of the ether was evaporated under reduced pressure and petroleum ether, b.p. 60–90°, was added to precipitate the reaction product. The precipitated crystals were collected by filtration and recrystallized, first from ethanol and then from methanol, to give 3-phenyl-5-($\alpha$-cyanobenzylidene)oxazolidine-2,4-dione, m.p. 216°. The infrared and nuclear magnetic resonance spectra of the product were consistent with the assigned structure. The following elemental analysis was obtained:

Calc. for $C_{17}H_{10}N_2O_3$: C, 70.34; H, 3.47; N, 9.65
Found: C, 70.45; H, 3.42; N, 9.36

EXAMPLE 2

The procedure of Example 1 was repeated, except that the phenyl isocyanate was replaced with 30.6 parts of 4-chlorophenyl isocyanate and the amount of ether was increased to 500 parts. Upon standing for 25 days, a solid precipitated which was isolated by filtration and washed with ether, giving 30 parts (90 percent yield) of 3-(4-chlorophenyl)-5-($\alpha$-cyanobenzylidene)oxazolidine-2,4-dione. A portion of the product was recrystallized twice from ethanol, giving an analytical sample, m.p. 228°. The following elemental analysis was obtained:

Calc. for $C_{17}H_{10}ClN_2O_3$: C, 62.87; H, 2.79; N, 8.62
Found: C, 62.59; H, 2.82; N, 8.89

3-(4-Chlorophenyl)-5-($\alpha$-cyanobenzylidene)-oxazolidine-2,4-dione also was prepared by refluxing for one hour a solution of 57.4 parts of ethyl phenylcyanopyruvate and 47.6 parts of 4-chlorophenyl isocyanate in 580 parts of tetrahydrofuran. The reaction solution was cooled and product precipitated by adding hexane. The resulting solid was collected by filtration and washed with ether to give 56.3 parts (83 percent) of product, m.p. 201°–209°.

EXAMPLE 3

A solution of 16 parts of ethyl phenylcyanopyruvate, 25 parts of 1-naphthyl isocyanate, and about 0.05 part of triethylenediamine in 360 parts of ether was allowed to stand at ambient temperature for about 6 weeks. The solid which had precipitated was collected by filtration and washed with ether, giving 25 parts (80 percent yield) of 3-(1-naphthyl)-5-($\alpha$-cyanobenzylidene)oxazolidine-2,4-dione. A portion of the product was recrystallized twice from ethanol to give an analytical sample, m.p. 204°–205°. The following elemental analysis was obtained:

Calc. for $C_{21}H_{12}N_2O_3$: C, 74.11; H, 3.55; N, 8.23
Found: C, 74.26; H, 3.84; N, 8.28

EXAMPLE 4

The procedure of Example 3 was repeated, except that the ethyl phenylcyanopyruvate was replaced with 15.1 parts of ethyl 4-chlorophenylcyanopyruvate and the 1-naphthyl isocyanate was replaced with 14.3 parts of phenyl isocyanate. After seven days, the solid which had precipitated was collected by filtration and washed with ether, giving 10.5 parts (35 percent) filtration and washed with ether, giving 10.5 parts (35 percent of 3-phenyl-5-($\alpha$-cyano-p-chlorobenzylidene)oxazolidine-2,4-dione. A portion of the product was recrystallized twice from N,N-dimethylformamide-ethanol to provide an analytical sample, m.p. 236°–238°. The following elemental analysis was obtained:

Calc. for $C_{17}H_9ClN_2O_3$: C, 62.87; H, 2.79; N, 8.62
Found: C, 62.91; H, 2.91; N, 8.87

EXAMPLE 5

Ethyl 4-chlorophenylcyanopyruvate, 12.6 parts, was dissolved in 360 parts of ether, to which solution was added about 0.05 part of triethylenediamine dissolved in several parts of ether. To the resulting solution was added a solution of 15.4 parts of 4-chlorophenyl isocyanate dissolved in 90 parts of ether. The reaction solution was allowed to stand for 6 days at ambient temperature. The yellow solid which precipitated was isolated by filtration and washed twice with ether to give 10 parts (55 percent) of 3-(4-chlorophenyl)-5-(α-cyano-p-chlorobenzylidene)oxazolidine-2,4-dione. An attempt to recrystallize a portion of the product from ethanol resulted in decomposition, giving red crystals, m.p. 328°–330°. The following elemental analysis was obtained on the unrecrystallized product:

Calc. for $C_{17}H_8Cl_2N_2O_3$: C, 54.84; H, 2.24; N, 7.80
Found: C, 56.90; H, 2.51; N, 7.67

The compounds of Examples 1–5, inclusive, were evaluated as antiviral agents by means of the procedure of C. E. Redman, et al., 1967, In Vivo Antiviral Chemotherapy, I. Experimental Design and Statistical Evaluation, Antimicrobial Agents and Chemotherapy-1966, pp. 497–502. In general, the 10 percent suspensions of homogenized mouse lung were stored in sealed glass ampules at −90°. At the time of use, the desired amount of 10 percent suspension was thawed and diluted sufficiently to give about 90 percent mortality in the control group.

Each injection of either saline or the compound under evaluation consisted usually of about 0.25 ml. of material. In the latter instance, the compound under evaluation was suspended in a 2 percent by weight solution of a nonionic polyhydroxylated polysaccharide emulsifying agent.

The data obtained were converted, following the procedure of C. E. Redman, et al., supra, to the survival index (sI), mean day of death (MDD), and ratio of the number of survivors to the number of animals on treatment (S/n). The denominator of S/n also indicates the number of mice employed in that particular group.

The survival index, SI, is a composite measure of the effectiveness of a compound and incorporates both time of death and number of survivors into s single variable. The SI primarily is used to aid in the interpretation of animal tests employing lethal infections. The SI results from a linear transformation of the proportion of deaths and the day of death.

EXAMPLE 6

The evaluation of the compounds of Examples 1-5, inclusive, as antiviral agents gave the following results against PR8, group A2, influenza virus:

| Compound Example | Dose, mg/kg[a] | SI | MDD | S/n |
|---|---|---|---|---|
| 1 | 80 | 3.73[b] | 6.8 | 0/12 |
| Control | — | 1.47 | 5.7 | 0/12 |
| 2 | 80 | 5.12[b] | 8.5 | 1/12 |
| Control | — | 1.82 | 7.3 | 0/12 |
| 3 | 100 | 4.46[b] | 7.9 | 5/18[c] |
| Control | — | 2.56 | 7.6 | 2/36 |
| 4 | 100 | 3.38[b] | 7.0 | 0/18 |
| Control | — | 2.35 | 7.3 | 0/36 |
| 5 | 80 | 4.16[b] | 7.7 | 3/12[c] |
| Control | — | 2.34 | 7.0 | 1/12 |

[a] Each compound was administered intraperitoneally, in a dosage equivalent to the indicated dose, at 24 and 4 hour preinfection and at 24 and 48 hour post-infection, for a total of four administrations of the compound to each mouse in the test group; control mice received an equal amount of saline in place of the test compound.
[b] SI statistically significant, at the 95% level, compared with control.
[c] A three-fold increase in the number of survivors is considered indicative of activity.

It should be noted that either SI of S/n alone can be indicative of activity, although SI is the preferred indicator for the reasons presented in C. E. Redman, et al., supra. Also, it should be noted that SI still is indicative of activity when below a value which is statistically significant at the 95 percent confidence level.

What is claimed is:

1. A compound of the formula,

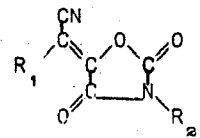

wherein $R_1$ is a monovalent aryl group selected from the group consisting of phenyl and p-chlorophenyl and $R_2$ is a monovalent aryl group selected from the group consisting of phenyl, p-chlorophenyl, and 1-naphthyl, with the limitation that when $R_2$ is 1-naphthyl, $R_1$ is phenyl.

2. The compound of claim 1, wherein $R_1$ and $R_2$ both are phenyl.

3. The compound of claim 1, wherein $R_1$ is phenyl and $R_2$ is p-chlorophenyl.

4. The compound of claim 1, wherein $R_1$ is phenyl and $R_2$ is 1-naphthyl.

5. The compound of claim 1, wherein $R_1$ is p-chlorophenyl and $R_2$ is phenyl.

6. The compound of claim 1, wherein $R_1$ and $R_2$ both are p-chlorophenyl.

* * * * *